(12) United States Patent
McWilliam et al.

(10) Patent No.: US 6,976,861 B2
(45) Date of Patent: Dec. 20, 2005

(54) HANDHELD ELECTRONICS DEVICE HAVING PIVOTAL HINGE MECHANISM

(75) Inventors: Giles D. McWilliam, Chicago, IL (US); Mark W. Oliver, Fox River Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/832,008

(22) Filed: Apr. 26, 2004

(65) Prior Publication Data

US 2005/0239306 A1  Oct. 27, 2005

(51) Int. Cl.[7] .............................................. H10R 3/00
(52) U.S. Cl. ................................................... 439/165
(58) Field of Search ........................... 439/165, 31, 65; 364/708.1; 361/756, 681, 679, 684; 455/90, 455/438, 550.1; 2/209; 381/383

(56) References Cited

U.S. PATENT DOCUMENTS

| | | | |
|---|---|---|---|
| 4,409,442 A * | 10/1983 | Kamimura ................... 381/383 |
| 4,450,495 A * | 5/1984 | Naruki ........................ 360/137 |
| 5,691,882 A * | 11/1997 | Ma ............................. 361/684 |
| 6,164,531 A * | 12/2000 | Harris et al. ................. 235/380 |
| 6,317,497 B1 * | 11/2001 | Ou .............................. 379/454 |
| 6,450,828 B1 * | 9/2002 | Gordon ....................... 439/347 |
| 6,544,075 B1 * | 4/2003 | Liao ............................ 439/638 |
| 6,549,789 B1 | 4/2003 | Kfoury |
| 6,650,547 B2 * | 11/2003 | Hemmi et al. .............. 361/755 |
| 6,654,966 B2 * | 12/2003 | Rolla ............................. 2/209 |
| 2004/0203520 A1 * | 10/2004 | Schirtzinger et al. ....... 455/90.3 |
| 2004/0257758 A1 * | 12/2004 | Krieger et al. .............. 361/683 |

OTHER PUBLICATIONS

SAMSUNG, mobile review.com, pictures of electronic device, 8 pages.

* cited by examiner

Primary Examiner—P. Austin Bradley
Assistant Examiner—Phuongchi Nguyen
(74) Attorney, Agent, or Firm—Roland K. Bowler, II

(57) ABSTRACT

A handheld electronics device having a display (150) on a first housing portion and a keypad (162) on a second housing portion, a hinge member 130 includes a first portion member pivotally coupled to the first housing portion and a second portion pivotally coupled to the second housing portion. The display and/or keypad may be configured in either a landscape or portrait configuration upon opening the hinge member depending upon where the hinge member is pivoted relative to the housing portions.

17 Claims, 6 Drawing Sheets

HANDHELD ELECTRONICS DEVICE HAVING PIVOTAL HINGE MECHANISM

FIELD OF THE DISCLOSURE

The present disclosure relates generally to electronics devices, and more particularly to pivotal hinge mechanisms on electronics devices, for example wireless communications devices, and combinations thereof.

BACKGROUND OF THE DISCLOSURE

Wireless communications devices having hinged housings are known generally. U.S. Pat. No. 6,549,789 entitled "Portable Electronic Device With An Adaptable User Interface" for example, discloses a handheld cellular telephone having a clamshell style housing wherein first and second housing portions are coupled by a universal hinge at an upper end portion of the device. In U.S. Pat. No. 6,549,789, the hinge rotates about a first axis allowing the housing portions to fold and unfold relative to each other. The hinge in U.S. Pat. No. 6,549,789 also rotates about a second axis perpendicular to the first axis. The Samsung V500 cellular telephone also includes a clamshell style hinge. On the Samsung V500, a housing portion having a display is rotatable between landscape and portrait configurations.

The various aspects, features and advantages of the instant disclosure will become more fully apparent to those having ordinary skill in the art upon careful consideration of the following Detailed Description and the accompanying drawings described below.

DETAILED DESCRIPTION

The disclosure pertains to handheld electronics devices comprising generally first and second housing portions interconnected by a hinge member. The exemplary handheld electronics device is in the form of a handheld or pocket wireless communications device including a display as is commonly found, for example, on cellular telephones and wireless enable personal digital assistants (PDA), as discussed more fully below. Alternatively, the electronics device may be a personal organizer, or a calculator, or some other device, with or without wireless communications capabilities.

Figure 1:
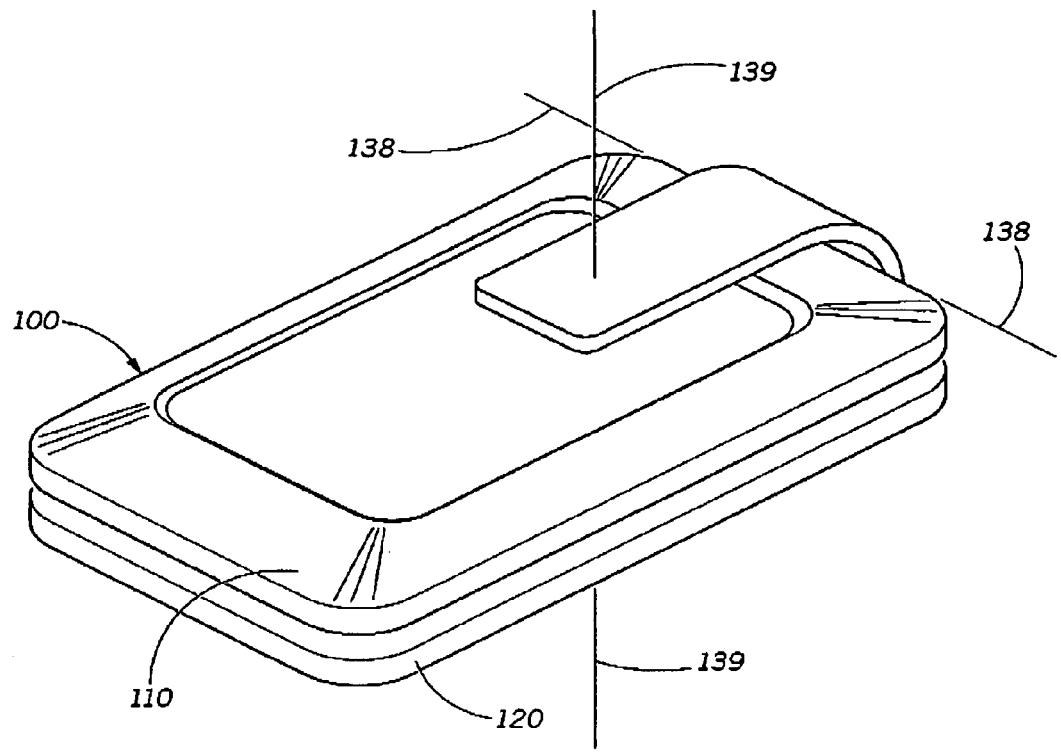
FIG. 1 is a perspective view of an exemplary electronics device having hinged housing portions in a closed configuration.
Figure 2:
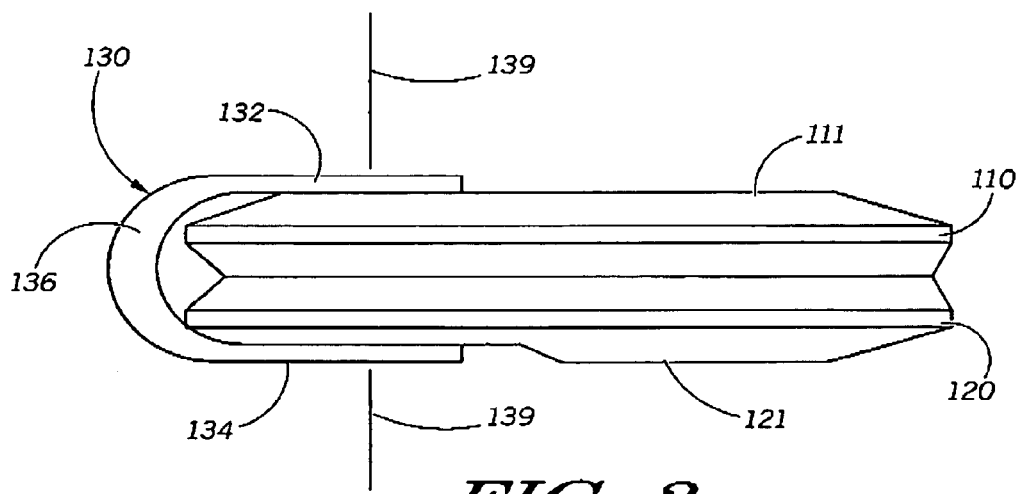
FIG. 2 is a side view of an exemplary electronics device having hinged housing portions in a closed configuration.

In FIG. 1, the exemplary handheld electronics device 100 comprises generally a first housing portion 110 coupled to a second housing portion 120 by an interconnecting hinge member 130. FIG. 2 also illustrates the elements of FIG. 2, wherein similar components are identified by like reference numerals. In FIGS. 1 and 2, the exemplary wireless communications device is in a closed configuration wherein the first and second housing portions are stacked on atop the other, as illustrated.

Figure 3:
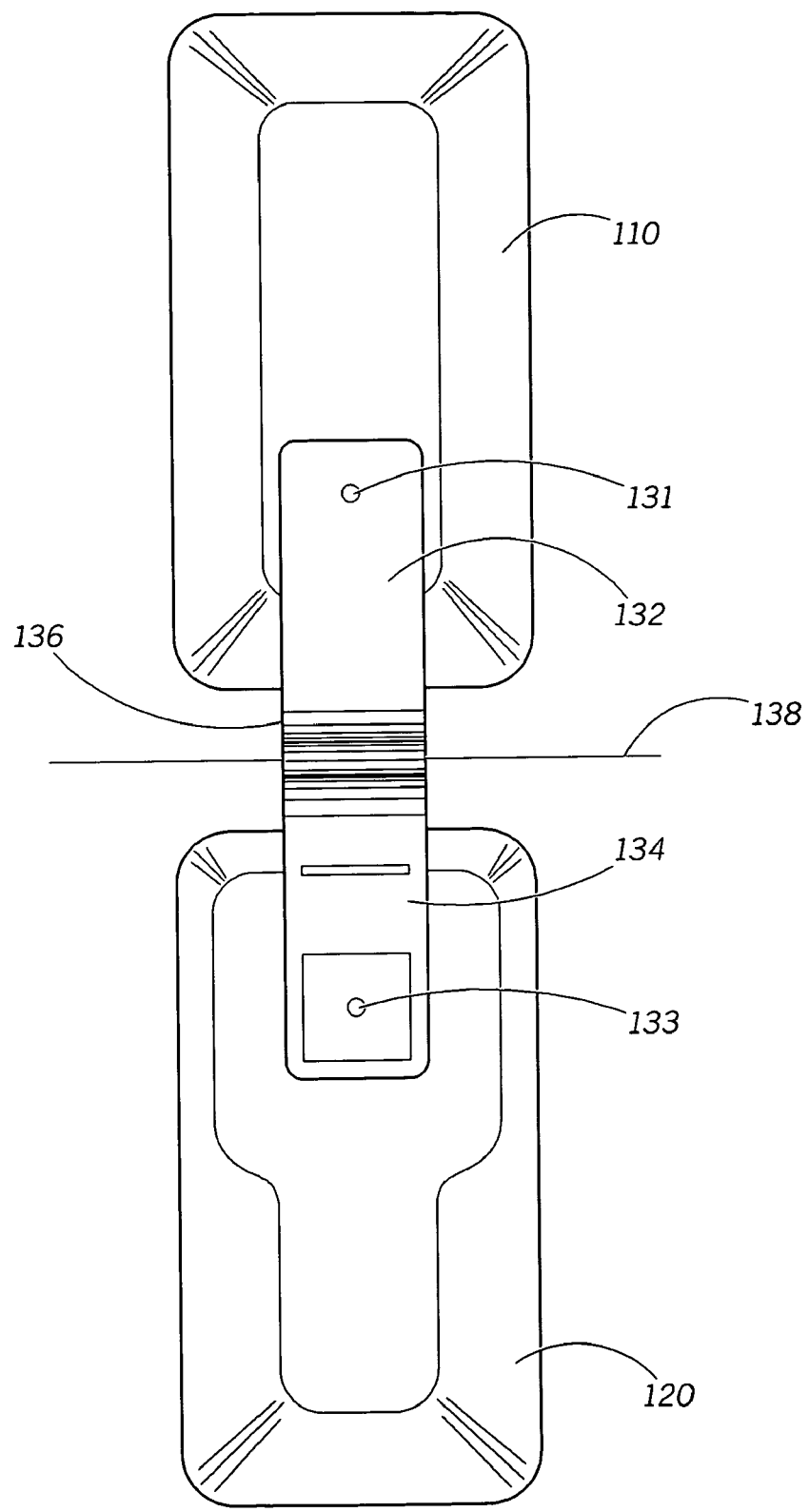
FIG. 3 is a backside view of an exemplary electronics device having hinged housing portions in an opened configuration.

Generally, the hinge member has a first portion coupled to the first housing portion and a second portion coupled to the second housing portion. In FIG. 2, the exemplary hinge member includes a first flange portion 132 coupled to the first housing portion and a second flange portion 134 coupled to the second housing portion 120. FIG. 2 illustrates the first flange portion 132 is coupled to the second flange portion 134 by a hinge portion 136, which permits the hinge member move between opened and closed configurations. In FIG. 2, the hinge member is in a closed configuration wherein the first and second housing portions are also in the closed configuration. In FIG. 3, the hinge member is in the opened configuration wherein the first and second housing portions are separated from each other.

Figure 11:
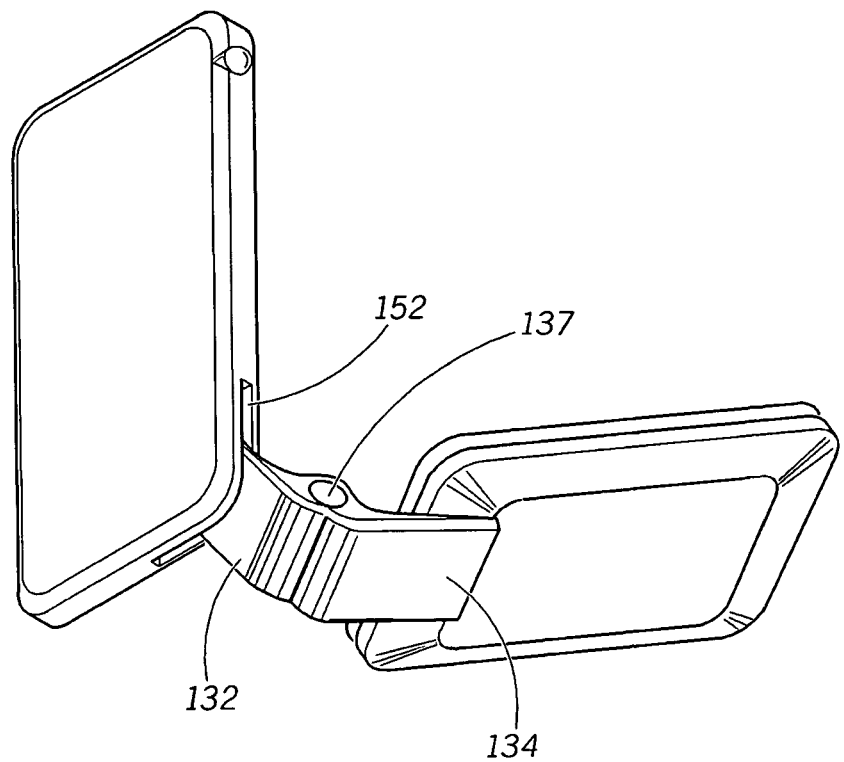
FIG. 11 illustrates another exemplary electronics device in an open and partially pivoted configuration.

In FIGS. 1–3, the exemplary hinge is an openable generally u-shaped hinge member disposed about the first and second housing portions when the first and second housing portions are in the closed configuration. In FIG. 11, the hinge portion includes a pivoting member 137. In some embodiments, the hinge includes a opening or closing mechanism, for example, a spring biased cam and follower assembly to assist rotating one housing portion relative to another while opening or closing. Alternatively, the hinge portion may be some other type of hinge, for example, a bendable or flexible member or material. The disclosure is not intended to be limited to any particular hinge mechanism. In some embodiments, for example, the hinge portion is a universal hinge that pivots or rotates about more than one axis as disclosed, for example, in U.S. Pat. No. 6,549,789. Other multi-axis hinges may also be used. The hinge portion will generally pivot about at least one hinge axis, for example, hinge axis 138 illustrated in FIGS. 2 and 3. The hinge member may be formed of a plastic, composite, metal or some other material, or a combination of materials.

According to another aspect of the disclosure, in some embodiments, the first portion of the hinge member is pivotally coupled to the first housing portion and the second portion of the hinge member is pivotally coupled to the second housing portion. In one embodiment, pivot members couple the hinge member to housing. In FIG. 3, for example, pivot member 131 pivotally couples the flange portion 132 to the housing portion 110, and pivot member 133 pivotally couples flange portion 133 to the housing portion 120. In other embodiments, the hinge member may be pivotally coupled to the housing portions by other structure or mechanisms.

In the exemplary embodiment of FIGS. 1 and 2, the hinge member pivots about a common axis 139 when the first and second housing portions are in the closed configuration, best illustrated in FIG. 2. In other embodiments, however these axes may be offset relative to each other. Generally, at least one of the hinge axes, for example, the hinge axis 138 in FIG. 1, is non-parallel to the axes about which the first and second hinge portions pivot. In FIG. 1, for example, the hinge axis 138 is perpendicular to the axes 139. The exemplary hinge axes 138 and 139 in FIG. 1 are also non-intersecting in the exemplary embodiments. In other embodiments, the hinge portion may include a rotation axis that is parallel to the axis 139 about which the housing portions are pivotally coupled to the hinge member.

Figure 9:
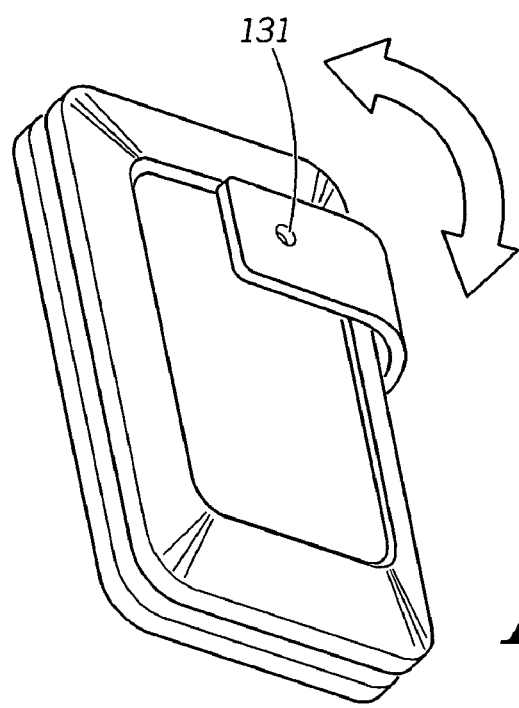
FIG. 9 illustrates another exemplary electronics device with a pivotal hinge located in a corner in a first configuration.
Figure 10:
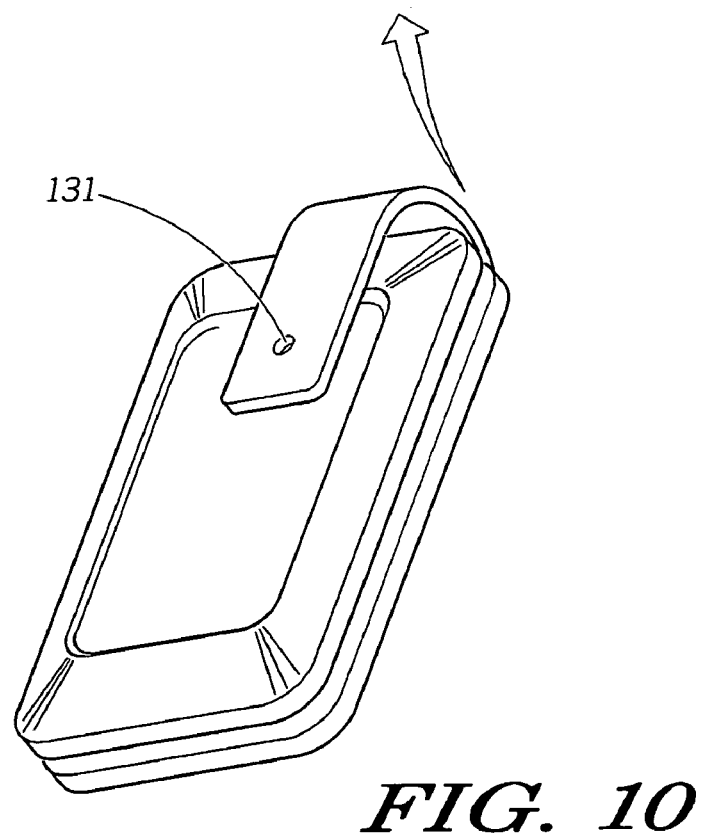
FIG. 10 illustrates another exemplary electronics device with a pivotal hinge located in a corner in a second configuration.

In FIG. 1, the pivot hinge member axis 139 is disposed asymmetrically toward one end of the rectangular housing assembly, though in other embodiments it may be located elsewhere through the closed housing assembly. In FIGS. 9 and 10, the hinge pivot 131 is located in a corner of the device. In some embodiments, locating the pivot axis symmetrically permits the hinge member to pivot through a greater angular range. In FIG. 1, for example, the pivot axis 129 is located symmetrically at one end of the device, thus potentially permitting approximately 180 degrees of pivotal range. The hinge member in the exemplary embodiments of FIGS. 9 and 10 has a somewhat more limited range of approximately 90 degrees.

In the exemplary embodiment, the hinge member is an openable generally, u-shaped member disposed about the first and second housing portions when the first and second housing portions are in a closed or stacked configuration. In the exemplary embodiment of FIG. 2, the first and second flange portions 132 and 134 extend about outer sides 111 and 121 of the corresponding housing portions 110 and 120 in the closed configuration. In other embodiments, one or more of the hinge flange portions may be coupled to an inner side of the housing portions. In an alternative embodiment, one or both of the flange portions 132 and 134 are disposed on an inner side of the corresponding housing portions 110 and 120. In another alternative embodiment, the flange portions 132 and 134 extend into openings, for example, slots, of the corresponding housing portions. FIG. 11 illustrates an exemplary embodiment where at least one of the hinge flange portions 132 pivots in a corresponding slot 152 in the housing portion.

Generally, the hinge member pivots between first and second positions relative to the first and second housing portions when the first and second housing portions are in the stacked configuration. More generally, the housing portions are also rotatable relative to the hinge member when the housing portions are in the opened configuration. In some embodiments, the first and second housing portions are freely and independently rotatable relative to the hinge member.

Figure 4:
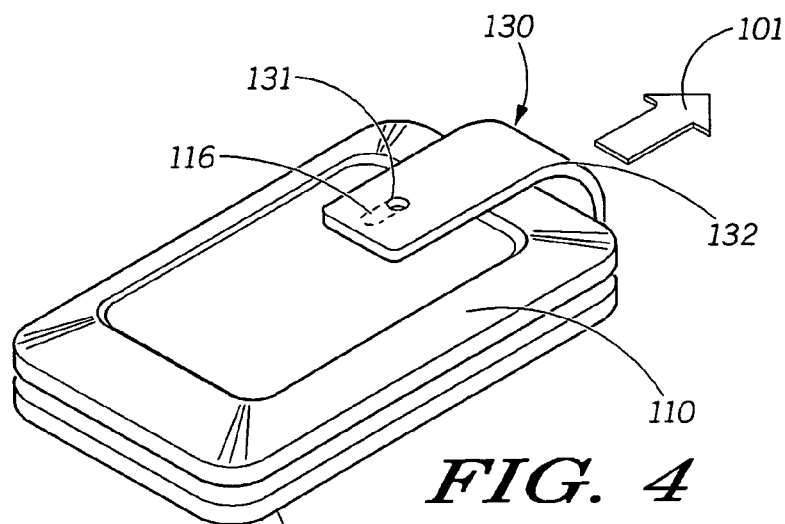
FIG. 4 illustrates an exemplary electronics device having a pivotal hinge member in a first position.
Figure 5:
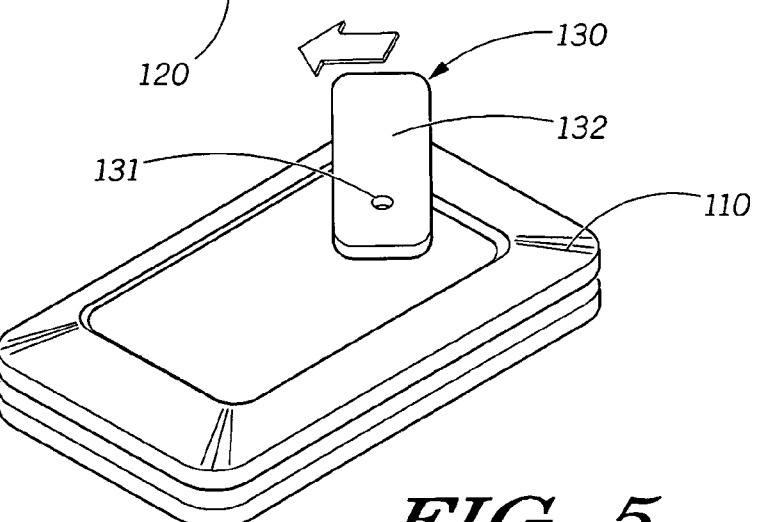
FIG. 5 illustrates an exemplary electronics device having a pivotal hinge member moved from the first position toward a second position.
Figure 6:
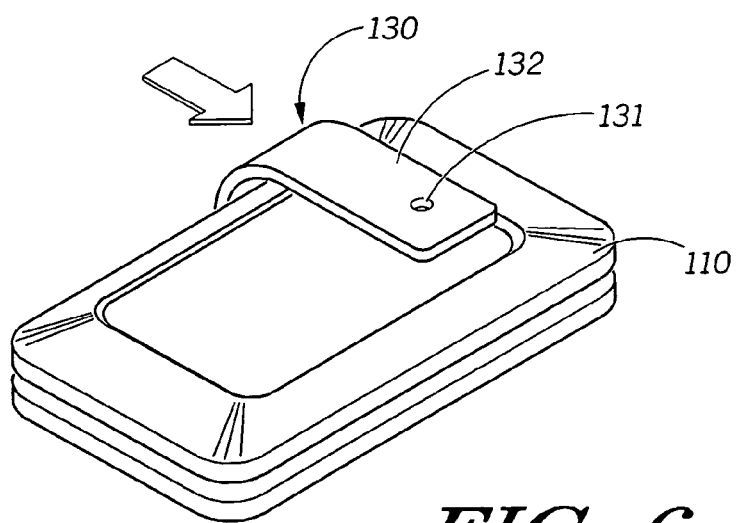
FIG. 6 illustrates an exemplary electronics device having a pivotal hinge member in the position.

FIGS. 4–6 illustrate the hinge member pivotal about at least a portion of the stacked or closed housing portions. The exemplary housing portions have a rectangular, or more generally an oblong, shape with longer and shorter sides. The exemplary sides are linear, though in other embodiments, the longer and shorter sides are curvilinear, for example, in the case of a flattened quasi-ellipsoidal housing assembly. In FIG. 4, the hinge member 130 is positioned initially along a shorter side of the housing portions 110 and 120. In FIG. 5, the hinge member 130 is rotated or pivoted about pivot 131 in the counter-clockwise direction towards another side of the closed housing assembly. In FIG. 6, the hinge member 130 is positioned along a longer side of the closed housing assembly.

Figure 12:
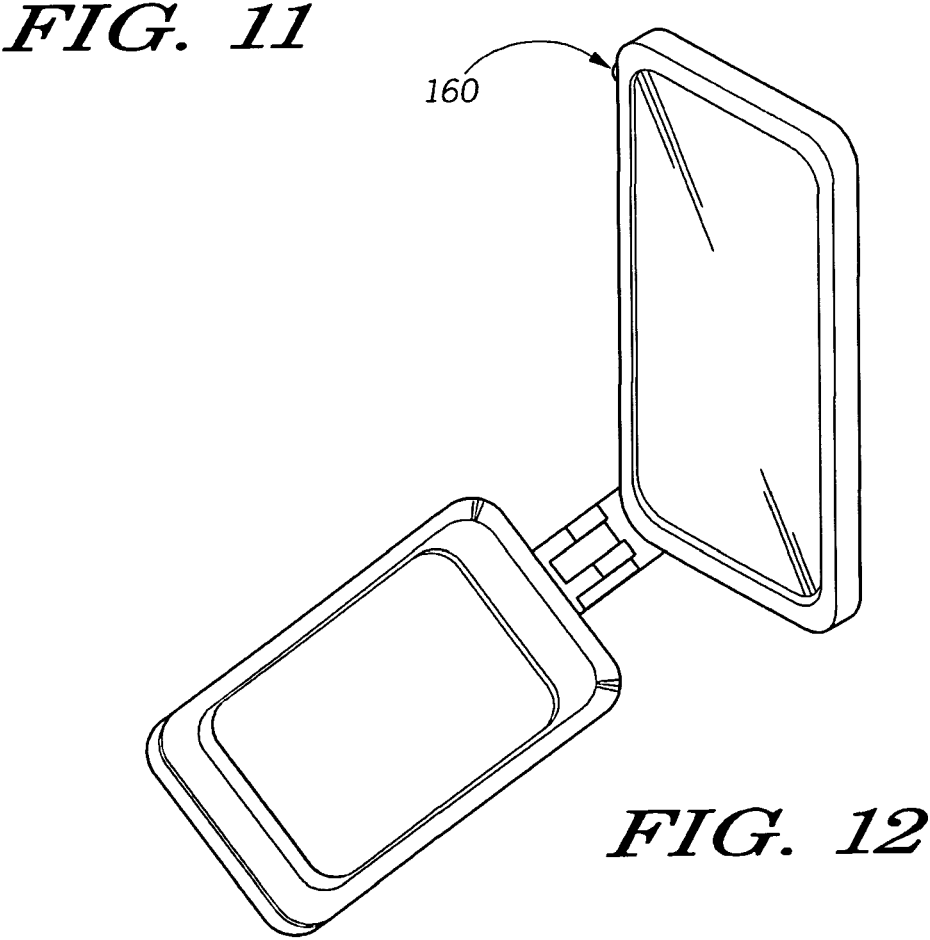
FIG. 12 illustrates view of another exemplary electronics device in an open and partially pivoted configuration.

In the exemplary embodiment of FIGS. 4–6, the hinge member pivots or rotates at least ninety degrees. In other embodiments, the hinge member may rotate through greater angles up to 180 and 360 degrees or more. In some embodiments, the rotation of the hinge member pivots is indexed. For example, detents on the hinge member or one of the housing portions may be used to positively lock or retain the hinge member in pre-selected positions. In other embodiments, other means may be used to index the hinge member. In one embodiment, the hinge member is indexed at 90 degrees of separation as illustrated in FIGS. 4 and 6. In other embodiments, the hinge may be indexed at lesser angles, for example, 30 or 45 degrees. In FIG. 12, a still or video camera 160 is located on one of the housing portions, wherein pivoting the hinge permits adjustment of the viewing angle.

In some embodiments, the hinge member must be moved outwardly in the direction of arrow 101 before the hinge member 130 may be rotated, as illustrated in FIG. 4. In FIG. 4, for example, the pivot member 131 coupled to the hinge member 130 may slide along a slot 116 disposed in the housing portions, before permitting rotation of the hinge member. In another alternative embodiment, the hinge member must be depressed before rotation thereof is permitted. Depressing the hinge member may release it from a catch, not illustrated, thereby freeing the hinge member for rotation. The hinge member may rotate in either direction or both directions.

In another embodiment, a U-shaped hinge slides laterally away from the housing to permit pivoting the hinge about a corner or other protruding portion of the housing. For example, the hinge could slide against the bias of the spring that urges the hinge toward the housing. Also, in one embodiment, the hinge includes an interlock that prevents rotation or pivoting of the hinge unless the hinge is first moved away from the housing.

Figure 7:
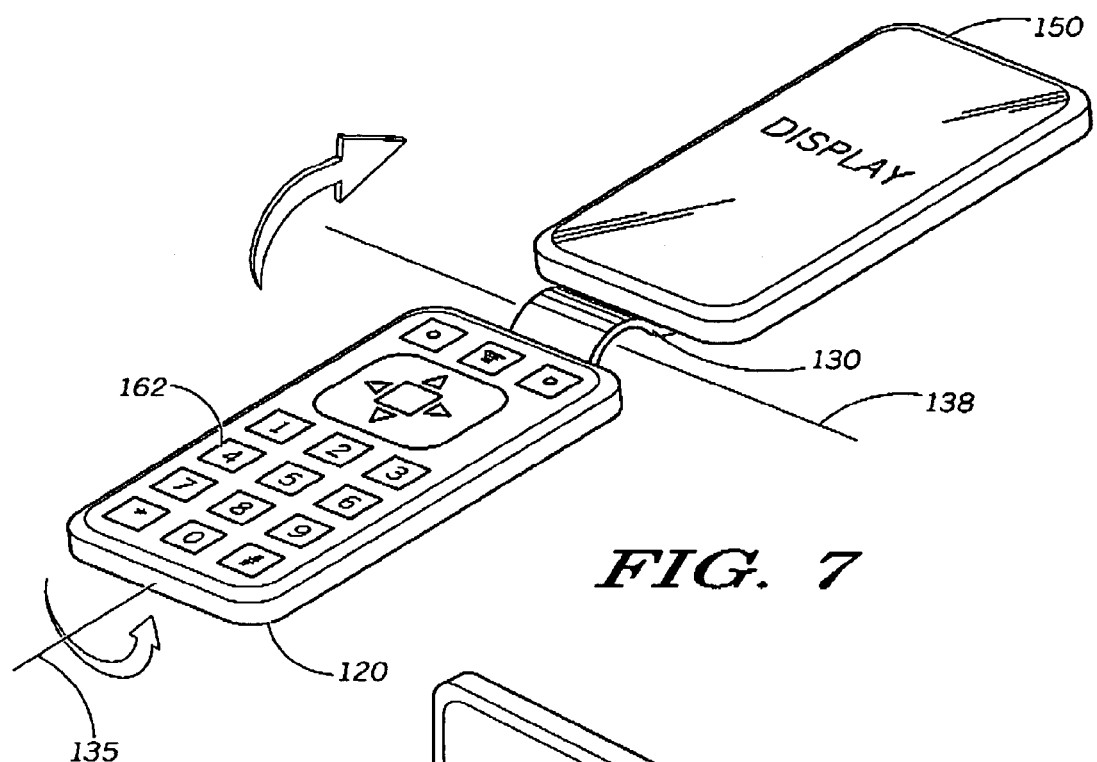
FIG. 7 illustrates an exemplary electronics device with a pivotal hinge positioned to configure first and second housing portions in a portrait configuration.

Generally, the hinge member may be opened when the hinge member pivoted to different positions relative to the housing portions. When the hinge member 130 is positioned as illustrated in FIG. 4, the housing portions may be opened or separable from the stacked configuration as illustrated in FIG. 7. Similarly, when the hinge member 130 is positioned as illustrated in FIG. 6, the housing portions may be opened or separable from the stacked configuration as illustrated in FIG. 8.

Figure 8:
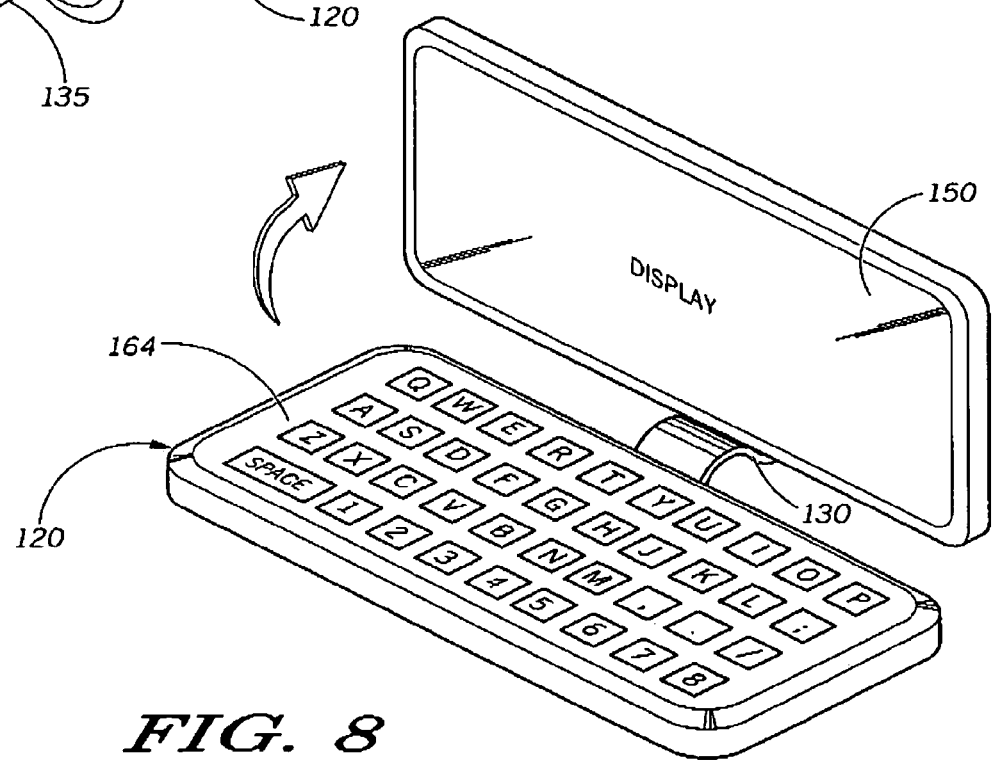
FIG. 8 illustrates an exemplary electronics device with a pivotal hinge positioned to configure first and second housing portions in a landscape configuration.

In the exemplary embodiment of FIGS. 7 and 8, at least one of the first and second housing portions includes a display 150 having a rectangular or more generally an oblong shape. In FIG. 7, the display is oriented in a portrait configuration when the first and second housing portions are opened, or separated from the stacked configuration, by opening the hinge member pivoted to the first position illustrated in FIG. 4. In FIG. 8, the display is oriented in a landscape configuration when upon opening the hinge member positioned in the second position illustrated in FIG. 6. Similarly, the in FIG. 7, the numeric/control keypad 162 is oriented in the portrait configuration when the hinge member is positioned in the first position illustrated in FIG. 4. The keypad 162 is oriented in a landscape configuration when the hinge member is located in the second position illustrated in FIG. 6.

In another embodiment, the housing portion 120 includes a numeric keypad 162 illustrated in FIG. 7 on one side and a Qwerty keypad 164, illustrated in FIG. 8, on the opposite side. For such an exemplary configuration, the hinge flange could be pivotally disposed in a slot between the keypads 162 and 164. According to this exemplary embodiment, the hinge member 130 is of the type that rotates about a second axis 135 transverse to the hinge axis 138, illustrated in FIG. 7. Rotation of the second housing portion 120 about the axis 135 relative to the hinge member 130 allows interchanging the keypads 162 and 164. The housing portions including the display and keypads may be pivoted independently relative to the hinge member. Thus in FIG. 7, the display 150 could be viewed in portrait or landscape configurations, while the keypad 162 is configured in either a landscape or portrait configuration without regard for the configuration of the display 150.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A handheld electronics device, the electronics device comprising:

first and second housing portions;

an openable generally u-shaped hinge member disposed about the first and second housing portions when the first and second housing portions are in a stacked configuration, a portion of the hinge member pivotally coupled to the first housing portion and another portion of the hinge member pivotally coupled to the second housing portion, the hinge member pivotal about an axis extending through the first and second housing portions when the first and second housing portions are in the stacked configuration, the hinge member pivotal between first and second positions relative to the first and second housing portions when the first and second housing portions are in the stacked configuration, the first and second housing portions separable from the stacked configuration when the hinge member is in the first position and when the hinge member is in the second position.

2. The handheld electronics device of claim 1, the hinge member pivotal at least ninety degrees between the first and second positions relative to the first and second housing portions when the first and second housing portions are in the stacked configuration.

3. The handheld electronics device of claim 1, the first and second housing portions having generally oblong shapes with longer and shorter sides, the first position of the hinge member along the longer side of the first and second housing portions when the first and second housing portions are in the stacked configuration, the second position of the hinge member along the shorter side of the first and second housing portions when the first and second housing portions a re in the stacked configuration.

4. The handheld electronics device of claim 1, at least one of the first and second housing portions including a display having an oblong shape, the display oriented in a portrait configuration when the first and second housing portions are separated from the stacked configuration by opening the hinge member in the first position, the display oriented in a landscape configuration when the first and second housing portions are separated from the stacked configuration by opening the hinge member in the second position.

5. A handheld electronics device, the electronics device comprising:

first and second housing portions;

an openable generally u-shaped hinge member disposed about the first and second housing portions when the first and second housing portions are in a stacked configuration, a portion of the hinge member pivotally coupled to the first housing portion and another portion of the hinge member pivotally coupled to the second housing portion, the hinge member pivotal about a first pivot axis between the first and second positions relative to the first and second housing portions when the first and second housing portions are in the stacked configuration, the hinge member pivotal about a second axis not aligned with the first axis, the first and second housing portions separable from the stacked configuration when the hinge member is pivoted about the second axis, the first and second housing portions separable from the stacked configuration when the hinge member is in the first position and when the hinge member is in the second position.

6. The handheld electronics device of claim 5, the first and second axes are perpendicular and non-intersecting.

7. The handheld electronics device of claim 5, the first pivot axis located in a corner of the device.

8. A handheld electronics device, the electronics device comprising:

first and second housing portions;

a hinge member having a first portion pivotally coupled to the first housing portion, the hinge member having a second portion pivotally coupled to the second housing portion, the hinge member pivotal between first and second positions relative to the first and second housing portions when the first and second housing portions are in a stacked configuration, the hinge member movable to permit separating the first and second housing portions from the stacked configuration when the hinge member is in the first position, and the hinge member movable to permit separating the first and second housing portions from the stacked configuration when the hinge member is in the second position, a pivot axis of the hinge member non-parallel to a pivot axis about which the first and second hinge portions are pivotally coupled to the first and second housing portions.

9. The handheld electronics device of claim 8, the first and second housing portions having a generally oblong shape with long and short sides when in the stacked configuration, the first position of the hinge member on the long side of the first and second housing portions, the second position of the hinge member on the short side of the first and second housing portions.

10. The handheld electronics device of claim 8, at least one of the first and second housing portions including a display having an oblong shape, the display oriented in a portrait configuration when the hinge member is in the first position, the display oriented in a landscape configuration when the hinge member is in the second position.

11. The handheld electronics device of claim 8, the pivot axis of the hinge member substantially perpendicular to the axes about which the first and second hinge portions are coupled to the first and second housing portions.

12. An electronics device, the electronics device comprising:

first and second housing portions;

a hinge member having first and second portions movably connected to each other about a first axis, the first portion of the hinge member pivotally coupled to the first housing portion and the second portion of the hinge member pivotally coupled to the second housing portion, the hinge member having a hinge axis non-parallel to axis portions about which the first and second portions of the hinge member are coupled to the first and second housing portions.

13. The electronics device of claim 12, the hinge member having an open and closed configuration, the first and second housing portions movable between a closed configuration where the first and second housing portions are disposed one atop the other to an open configuration where the first and second housing portions are separated from each other.

14. The electronics device of claim 12, the hinge member positionable along different sides of the first and second housing portions when the first and second housing portions are in a closed configuration.

15. The electronics device of claim 12, the hinge member movable along different sides of the first and second housing portions when the first and second housing portions are in the stacked configuration, the hinge member having open and closed configurations when the hinge member is positioned along the different sides of the first and second housing portions.

16. The electronics device of claim 15, the first and second housing portions having a generally oblong shape, the hinge member movable along a longer side of the first and second housing portions when the first and second housing portions are in the stacked configuration, the hinge member movable along a shorter side of the first and second housing portions when the first and second housing portions are in the stacked configuration.

17. The electronics device of claim 15, one of the first and second housing portions including a display having an oblong shape, the display oriented in a portrait configuration when the hinge member is opened from one side of the first and second housing portions, the display oriented in a landscape configuration when the hinge member is opened from another side of the first and second housing portions.

* * * * *